July 7, 1959  R. C. DARNELL  2,893,629
FUEL FILTER
Filed June 11, 1956

INVENTOR.
REX C. DARNELL
BY
ATTORNEYS.

United States Patent Office 2,893,629
Patented July 7, 1959

2,893,629

FUEL FILTER

Rex C. Darnell, Dexter, Mich., assignor to Michigan Wire Cloth Company, Detroit, Mich., a corporation of Michigan Application June 11, 1956, Serial No. 590,756

3 Claims. (Cl. 233—27)

This invention relates to fuel filters designed especially for use with fuel burning engines, where such fuel before being delivered to the engine must be cleansed of all foreign matters above a certain particle size.

Filters heretofore used with such engines are usually of a type using a screen or other porous material through which the fuel flows and which arrests and holds the foreign material.

There are certain disadvantages with such a porous or screen type filter. In the first place as it accumulates foreign matter, it offers more resistance to the flow of the fluid through it to the point where it may ultimately plug up and seriously retard such flow, which makes it necessary under certain conditions to frequently clean such a filter.

Moreover in certain applications, especially aircraft operating at high altitudes, any water or moisture in the fuel will and does create an icing condition on such screen and porous type filters to completely block off the flow.

The answer to this is to provide a relief valve to shunt the fluid around the filter, but in this case there is no protection from the foreign matter.

Other methods to de-ice or remove ice and sludge from the filter are sometimes used including the use of dual filters with means to inject alcohol in one to de-ice it.

The device herein described has for its object the separation of the foreign particles without at any time increasing the flow resistance.

Likewise, since the passageway is free for the flow of the fluid, it is free from icing.

For a given space requirement for the accommodation of a filtering means, the unit to be described has been shown to have a much greater operating life than any porous or screen type filter, thus minimizing the cleanings necessary for proper functioning.

Figure 1:
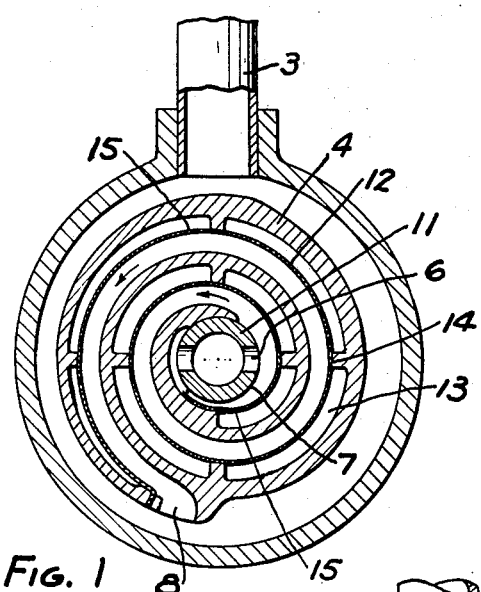
Fig. 1 is a cross section taken on the line 1—1 of Fig. 2.
Figure 3:
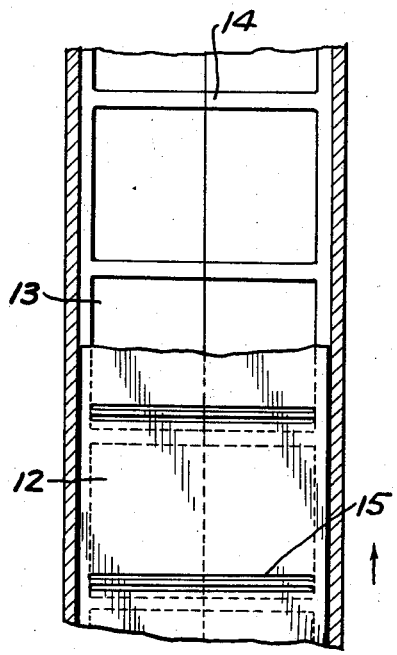
Fig. 3 is a developed plan view of the filter ribbon and the catch pockets.
Figure 2:
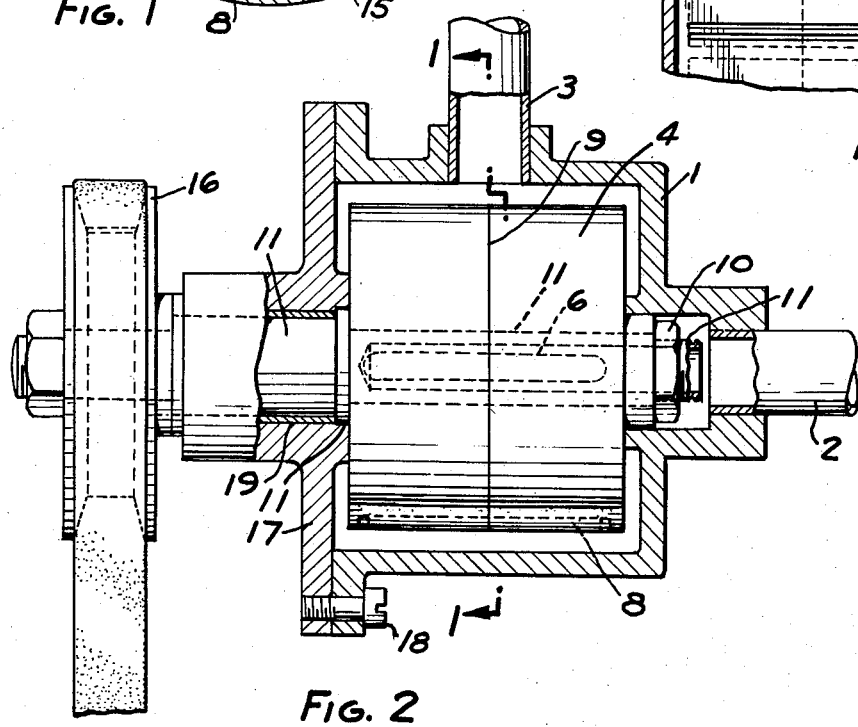
Fig. 2 is a longitudinal section of the filter and centrifuge.

The unit comprises a housing 1 which is situated in the fuel delivery system and connected by a pipe 2 to the supply pump, which forces the fuel under pressure through the filtering unit and out of the conduit or pipe 3, which delivers the fluid or fuel to the engine (not shown).

In its passage from the conduit 2 to the outlet 3, the fuel traverses a spiral path in the member 4 entering said spiral path by way of the hollow portion of shaft 11 and rotatable outlets 6 which are slots in said shaft, and thus into the spiral passageway 7 and follows the counter clockwise direction indicated by the arrows finding an exit 8 to the interior of the housing 1, and thence to the outlet pipe 3.

The element 4 is a spiral centrifuge. It has two parts similar or mating and having a junction at 9. The two halves are brought in mating relationship at the joint 9 through the medium of a nut 10 which draws up on the threaded part of the shaft 11.

The purpose of the two halves and the joint at 9 and the means for holding the parts together through the medium of the nut is to provide the means by which they can be taken apart and the interior of the element washed and cleaned. The element 4 actually comprises the two halves 4 having passageways 7 and pockets 13 which are formed through the medium of a ribbon 12, formed of thin metal and which has at the points indicated in its length, slots 15, which communicate between the passageway 7 and spaces 13 which are collecting or catch pockets for the foreign particles or contaminants which are separated from the fluid flowing through the passageway. Said pockets are separated by bridges 14 thus creating a number of said pockets for the accumulation of the foreign matter separated from the fluid passing through the conduit 7.

It will be understood that in the flow of the fluid from the supply pipe into the hollow shaft 5 and out through the opening 6 into the passageway 7, under the influence of the pressure and the consequent flow, high velocity is created which by virtue of the spiral conduit of increasing diameter will create substantial centrifugal forces in the fluid stream, tending to force the heavy particles within the fluid to the outside and in contact with the slotted ribbon 12, separating the fluid conduit 7 from the pockets 13. Such particles will in their travel from the beginning of passageway 7 to the outlet by reason of the centrifugal force developed or the "G" value developed pass from the passageway 7 into the pockets 13 through the slots 15. To augment this separating function to a substantial degree and to avoid the complete necessity of depending upon the high velocity in the passageway which would need to be excessively restricted, if dependence were placed on the velocity of said fluid through said passageway for the separation, the unit is attached to the shaft 11, and is rotated by said shaft through the medium of a pulley 16 or by the use of a gear attached to said shaft, or directly driven by being attached to a rotating part of the engine, or in fact motivated by any means to cause rotation of the shaft and the spiral centrifuge in a counter-clockwise direction corresponding with the counter-clockwise spiral passageway.

For example, the velocity of the fluid through the passageway of the spiral conduit is in the region of 18.2 feet per second producing a centrifugal force or "G" value (unit force of gravity) of 302 times "G" and the rotation of the element 4 is in the region of 3500 revolutions per minute giving an additional centrifugal force of 173 times "G" force, it being understood that the angular rotation of the fluid in the spiral passageway is in the same counter-clockwise direction as the rotating centrifuge element 4 so that the forces produced are additive, producing by this association a resultant value of 173+302 or 475 unit forces of gravity.

It should be understood that as a result of the linear velocity of the fluid through the spiral passageway, the angular velocity is greatest at the center or smallest radius of the passageway, and thus its effective "G" value resulting from said angular velocity is substantially the same as produced at the outer end of the spiral where the linear velocity is similar but the angular velocity lower but operating at an increased radius.

The contaminant or foreign particles likely to be found within the fuel may vary from 5 to 300 microns, the largest percentage of which may be below 30 microns and which are not detrimental to the operation of the engine system. It is those above 30 which need to be taken out of the fluid and this device by virtue of it depending upon centrifugal force for the separation has the capacity to differentiate between said particle sizes.

The flange 17 may be of any configuration and carries within it bearings 19 in which the shaft 11 revolves and provides for the attachment of the casing or housing 1 through the medium of screws 18.

I claim:

1. A centrifuge filter or separator comprising, a housing having an inlet at one end of its axis to receive the fluid from a pressure source and an outlet, a rotating conduit supported in the housing on an axis coincidental with the axis of the housing of spiral form through which fluid must pass in its transit from the supply end to the outlet end of said housing, said conduit having on its inside a spiral ribbon and pockets behind the ribbon to receive and retain particles thrown out of the stream and through the holes in the ribbon, and means for rotating this conduit.

2. The combination claimed in claim 1 in which said spiral centrifuge comprises two halves, held together midway of their length by a threaded shaft and a nut, holding said two halves together, upon said shaft, and adapted to be rotated by external means.

3. The combination claimed in claim 1 in which the ribbon is slotted and over bridges on the spiral conduit forming the pockets.

References Cited in the file of this patent

UNITED STATES PATENTS

| | | |
|---|---|---|
| 1,003,118 | McKellar | Sept. 12, 1911 |
| 2,765,979 | Boestad et al. | Oct. 9, 1956 |